US005737450A

United States Patent [19]
Hajjahmad et al.

[11] Patent Number: 5,737,450
[45] Date of Patent: Apr. 7, 1998

[54] METHOD AND APPARATUS FOR FAST TWO-DIMENSIONAL COSINE TRANSFORM FILTERING

[75] Inventors: Ibrahim Hajjahmad, Malden; Munib A. Wober, Haverhill, both of Mass.

[73] Assignee: Polaroid Corporation, Cambridge, Mass.

[21] Appl. No.: 441,383

[22] Filed: May 15, 1995

[51] Int. Cl.$^6$ ............................................... G06K 9/40
[52] U.S. Cl. .................. 382/260; 382/263; 382/264; 348/403; 358/433
[58] Field of Search ................... 382/260, 261, 382/262, 263, 264, 265, 266, 275, 232; 358/432, 433, 447; 345/129, 130; 348/403, 630, 631; 364/724.01, 724.13, 725

[56] References Cited

U.S. PATENT DOCUMENTS

| | | | |
|---|---|---|---|
| 5,168,375 | 12/1992 | Reisch et al. | 358/432 |
| 5,224,062 | 6/1993 | McMillan, Jr. et al. | 364/725 |
| 5,299,025 | 3/1994 | Shirasawa | 358/400 |
| 5,408,425 | 4/1995 | Hou | 364/725 |
| 5,563,718 | 10/1996 | Wober | 358/433 |

OTHER PUBLICATIONS

Y. Arai et al., "A Fast DCT-SQ Scheme for Images," Trans. IEICE, vol. E-71, No. 11 (Nov. 1988), pp. 1095-1097.

W.B. Pennebaker et al., *JPEG Still Image Data Compression Standard*, Van Nostrand Reinhold (1993), pp. 344-345.

Y. Arai et al., A Fast DCT-SQ Scheme for Images, Trans. IEICE, vol. E-71, No. 11 (Nov. 1988), pp. 1095-1097.

B.D. Tseng et al., "On Computing the Discrete Cosine Transform," IEEE Trans. Comput., vol. C-27, No. 10 (Oct. 1978), pp. 966-968.

E. Feig, "A Fast Scaled-DCT Algorithm," SPIE, vol. 1244 Image Processing Algorithms and Techniques (1990).

B.G. Lee, "A New Algorithm for the Discrete Cosine Transform," IEEE Trans. Acoust., Speech and Signal Process., vol. ASSP-32 (Dec. 1984), pp. 1243-1245.

*Primary Examiner*—Dwayne Bost
*Assistant Examiner*—Brian L. Johnson
*Attorney, Agent, or Firm*—Joseph Stecewycz

[57] ABSTRACT

A method and apparatus for applying an image filter to an image signal where image data terms, corresponding to the image signal, are converted by means of an overlapping operation and a scaled forward orthogonal transformation to form frequency coefficient matrices, the image filter is converted by means of a descaled orthogonal transformation to form a descaled frequency filter matrix, and the frequency coefficient matrices are multiplied by the descaled frequency filter matrix to form filtered coefficient matrices for conversion into a filtered image signal by means of an inverse orthogonal transformation process.

26 Claims, 13 Drawing Sheets

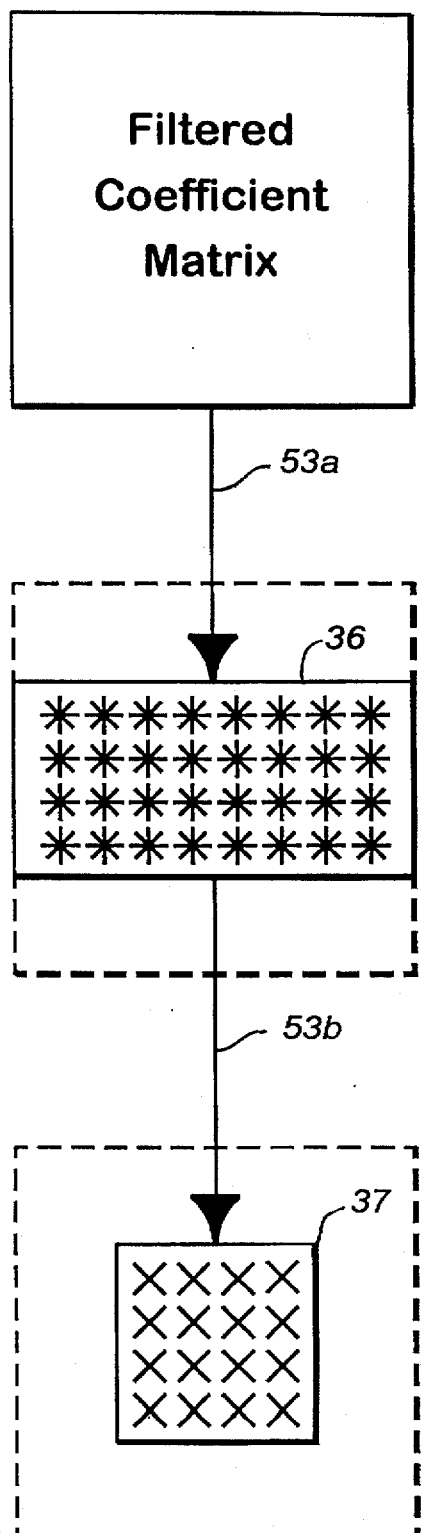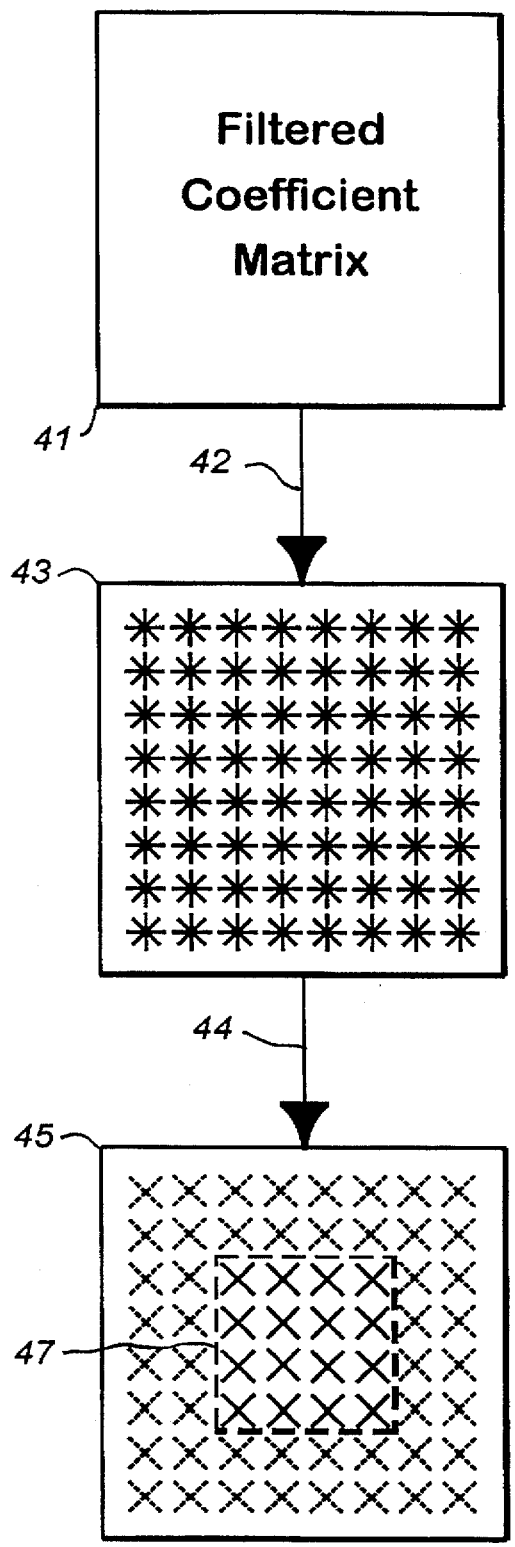
Fig. 7
Fig. 8
Prior Art

METHOD AND APPARATUS FOR FAST TWO-DIMENSIONAL COSINE TRANSFORM FILTERING

CROSS REFERENCE TO RELATED APPLICATION

This application is related to commonly-assigned U.S. patent application Ser. No. 08/159,733 by Wober et al. entitled 'Image coding by use of discrete cosine transforms' filed Nov. 30, 1993.

FIELD OF THE INVENTION

This invention relates to image processing and, more particularly, to a method and apparatus for filtering electrical image signals by using fast discrete cosine transforms.

BACKGROUND OF THE INVENTION

Image processing procedures, such as transform image coding and image filtering, are employed in various applications, including the electronic conversion of photographic images, the reproduction of graphical information in a printing operation, and the transmittal of digital image data by means of electronic communication systems. In such applications, image processing is performed upon an original source image which has been provided as a series of electrical image signals, where each signal corresponds to the characteristic of an element, or pixel, of the original source image. The electrical image signals are converted into a digital source image comprising a two-dimensional set of numerical values representing the source image pixels. These numerical values are commonly configured into a two-dimensional H×V array of image data terms. Each term in the image data array thus corresponds to a particular pixel in the original source image and quantitatively describes a feature characteristic of the pixel. In a standard display format, for example, the digital source image comprises an image data array of 640 columns and 480 rows of numerical values. Image processing generates a new set of processed numerical values, commonly denoted as reconstructed image data terms, which have been computationally derived from the digital source image. The processed numerical values are converted into a new series of electrical signals from which a processed digital image can be generated.

Image processing makes use of orthogonal transforms to convert image data terms into frequency coefficient terms and thus simplify subsequent processing computations. In most transform image coding procedures, for example, a discrete cosine transform (DCT) method is commonly used, and in most image filtering procedure a fast Fourier transform (FFT) is commonly used. The disclosed method and apparatus provide for the application to image filtering procedures of DCT methods, which are generally faster and more efficient than comparable FFT methods. Moreover, the disclosed method can be implemented in an apparatus compatible with JPEG hardware.

Cosine Transform Image Coding

Cosine transform image coding is an image processing procedure in which the digital source image terms are subjected to a two-dimensional forward discrete cosine transform (FDCT), quantized, and entropy encoded by a process such as a zig-zag sequencing with Huffman encoding. The encoded data is then stored or transmitted, usually much more efficiently than if the original digital source image terms had been used. The encoded data is subsequently decoded, dequantized, and converted into reconstructed image data terms by the application of an inverse cosine transform (IDCT). A processed digital image is subsequently obtained from the reconstructed image data terms.

The FDCT and IDCT applied in the process of transform image coding are commonly performed in accordance with an industrial standard established by the Joint Photographic Experts Group (JPEG). The ISO Draft International Standard 10918-1 for JPEG is described in Appendix A of the reference text, "JPEG Still Image Data Compression Standard," by William B. Pennebaker and Joan L. Mitchell. In accordance with the JPEG standard, a digitized source image is provided as a series of image-data matrices, usually formatted as 8×8 matrices, and the FDCT is applied to produce a series of frequency coefficient matrices.

Conversion of an image-data matrix into a frequency-coefficient matrix by means of the two-dimensional FDCT can be expressed in shorthand matrix notation as, $$S(v,\mu) = C \times s(j,i) \times C^T$$

where $S(v,\mu)$ are terms in the frequency coefficient matrix, $s(j,i)$ are terms in the image-data matrix, $C$ is the discrete cosine transform basis matrix, and $C^T$ is the transpose of $C$. The two-dimensional FDCT, as applied to 8×8 image-data matrices, is given by the equation, $$S(v,\mu) = \frac{1}{4} C_v C_\mu \sum_{j=0}^{7} \sum_{i=0}^{7} s(j,i) \cos\left[(2i+1)\frac{\mu\pi}{16}\right] \cos\left[(2j+1)\frac{v\pi}{16}\right]$$

where $C_k = 1/\sqrt{2}$ for k=0 and $C_k = 1$ for k>0. The frequency coefficient terms are, typically, quantized, transmitted or stored, and then dequantized. Reconstructed image data terms are obtained by means of a two-dimensional IDCT operation, which can be expressed in shorthand matrix notation as, $$r(j,i) = C^T \times R(v,\mu) \times C$$

where $r(j,i)$ are reconstructed image data terms and $R(v,\mu)$ are dequantized frequency coefficient terms. The corresponding two-dimensional IDCT is given by the equation, $$r(j,i) = \frac{1}{4} \sum_{v=0}^{7} \sum_{\mu=0}^{7} C_v C_\mu R(v,\mu) \cos\left[(2i+1)\frac{\mu\pi}{16}\right] \cos\left[(2j+1)\frac{v\pi}{16}\right].$$

Because the DCT has many attractive properties which make it suitable for various image processing operations, it has become an essential part in many of the emerging standards for the compression of both still and moving images. For instance, the DCT is one of the vital parts of the image compression portion in the JPEG standard for still picture coding and MPEG-1 and MPEG-2 standard for video coding. This increased interest in applying DCT processing techniques has lead to the development of more efficient computational methods.

One approach to improving DCT computational efficiency is to make use of a "scaled" FDCT in which scale factors are introduced into the basis matrix. One of the first efforts in this field is described in the reference technical article, "A Fast DCT-SQ Scheme for Images," by Yukihiro Arai et al. The algorithm developed by Arai is a one-dimensional 8-point scaled FDCT algorithm which requires only five multiplications and twenty-nine additions for transformation of eight image data terms. Use of the Arai algorithm in image processing applications has been largely limited to coding operations.

More recently, U.S. Pat. No. 5,299,025 to Shirasawa discloses a method which applies a two-dimensional FDCT by performing two linear FDCT calculations and achieves a reduction in the computational requirements for an 8×8 image-data matrix to 200 multiplications and 465 additions. Use of the Shirasawa algorithm has also been largely limited to coding operations.

Image Filtering

Image filtering is an image processing procedure in which frequency coefficient terms are mask multiplied by a filter matrix before inverse transformation is performed. In most conventional image filtering procedures, image data transformation is accomplished by means of fast Fourier transform (FFT) methods. The use of FFT methods requires the computation and interim storage of complex numbers comprising imaginary terms which are later discarded. Moreover, Fourier transform methods in the relevant art are generally limited to the use of unscaled transforms. This places an undesirable burden on the computational and storage requirements of an apparatus intended to make use of FFT methods.

U.S. Pat. No. 5,168,375 to Reisch et al. discloses a method for processing a field of image data samples to provide for one or more of the functions of decimation, interpolation, and sharpening. Sharpening is accomplished by a filtering operation involving cosine transforms of data and filter kernel in the frequency domain followed by an inverse transformation, to yield image data samples, some of which are discarded. The method disclosed by Reisch et al. makes use of unscaled DCT operations.

An image coding method, which can be implemented on JPEG hardware slightly modified so as to provide access to discrete cosine transform coefficients, is disclosed in a commonly assigned application by Wober et al. entitled 'Image coding by use of discrete cosine transforms.' The method uses an overlap procedure and unscaled DCT parameters to perform an image coding procedure which may also include a filtering operation.

Consequently, it appears that conventional image filtering methods and apparatuses have not realized the computational improvements attainable with the use of scaled orthogonal transforms. It is therefore an object of the present invention to provide an apparatus for filtering two-dimensional image data which utilizes faster and more efficient orthogonal transformation methods.

It is another object of the present invention to provide such a method and apparatus which make use of scaled and pruned orthogonal transform operations to achieve greater computational efficiency.

It is a further object of the present invention to provide such a method which can be implemented in a general purpose computing device.

SUMMARY OF THE INVENTION

The present invention results from the observation that a faster and more efficient image filtering apparatus can be achieved by incorporating scaled forward and scaled pruned inverse image data orthogonal transforms, a scaled filter matrix, and an efficient overlap process into the filtering procedure. The present invention provides a method and apparatus for applying an image filter to an image signal such that image data terms corresponding to the image signal are converted by means of an overlapping operation and a scaled forward transformation to form frequency coefficient matrices and the image filter is convened by means of a descaled transformation to form a descaled frequency filter matrix. The frequency coefficient matrices are multiplied by the descaled frequency filter matrix to form filtered coefficient matrices which are converted by means of a scaled pruned inverse transformation process to form filtered image-data matrices from which a filtered image signal is obtained.

BRIEF DESCRIPTION OF THE DRAWINGS

The novel features that are considered characteristic of the present invention are set forth with particularity herein. The organization and method of operation of the invention, together with other objects and advantages thereof, will be best understood from the following description of the illustrated embodiments when read in conjunction with the accompanying drawings wherein

FIG. 7 is a diagram illustrating the reduction of computational steps achieved in the application of the IDCT of FIG. 6;

FIG. 8 is a diagram illustrating the discarding of computed numerical data in the application of a conventional IDCT.

DETAILED DESCRIPTION OF THE INVENTION

Figure 1:
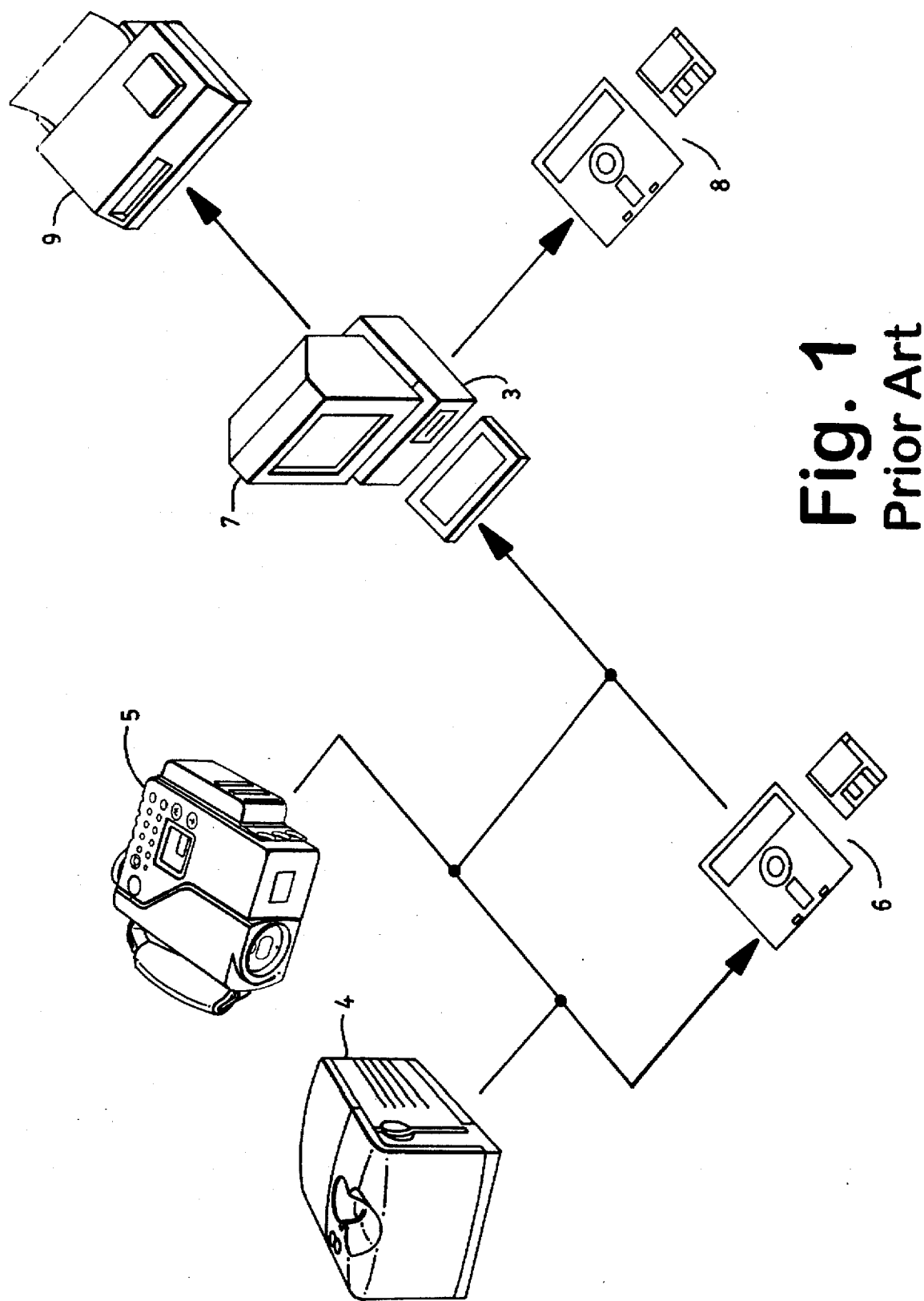
FIG. 1 is a diagrammatic illustration of a conventional image processing method showing data flow from a source image, through an image processor, and to an output image.

FIG. 1 is a diagram illustrating a typical image processing system used to perform image filtering, or convolution. An original source image is acquired as a series of electrical signals and transformed into a digital image by an image digitizer, such as an optical scanner 4 or a video camera 5. The digital image is provided to an image filtering unit 3 which receives and filters the digital image to produce filtered image data terms. Alternatively, the digital image can be stored in an input floppy disc 6 or in another storage medium before being provided to image filtering unit 3 The filtered image data terms produced by image filtering unit 3 can be stored, displayed, or transmitted to a compatible system. For example, data storage can be provided by an output floppy disc 8 or similar medium, and image display capability can be provided by a monitor 7 or a printing device 9.

Figure 2:
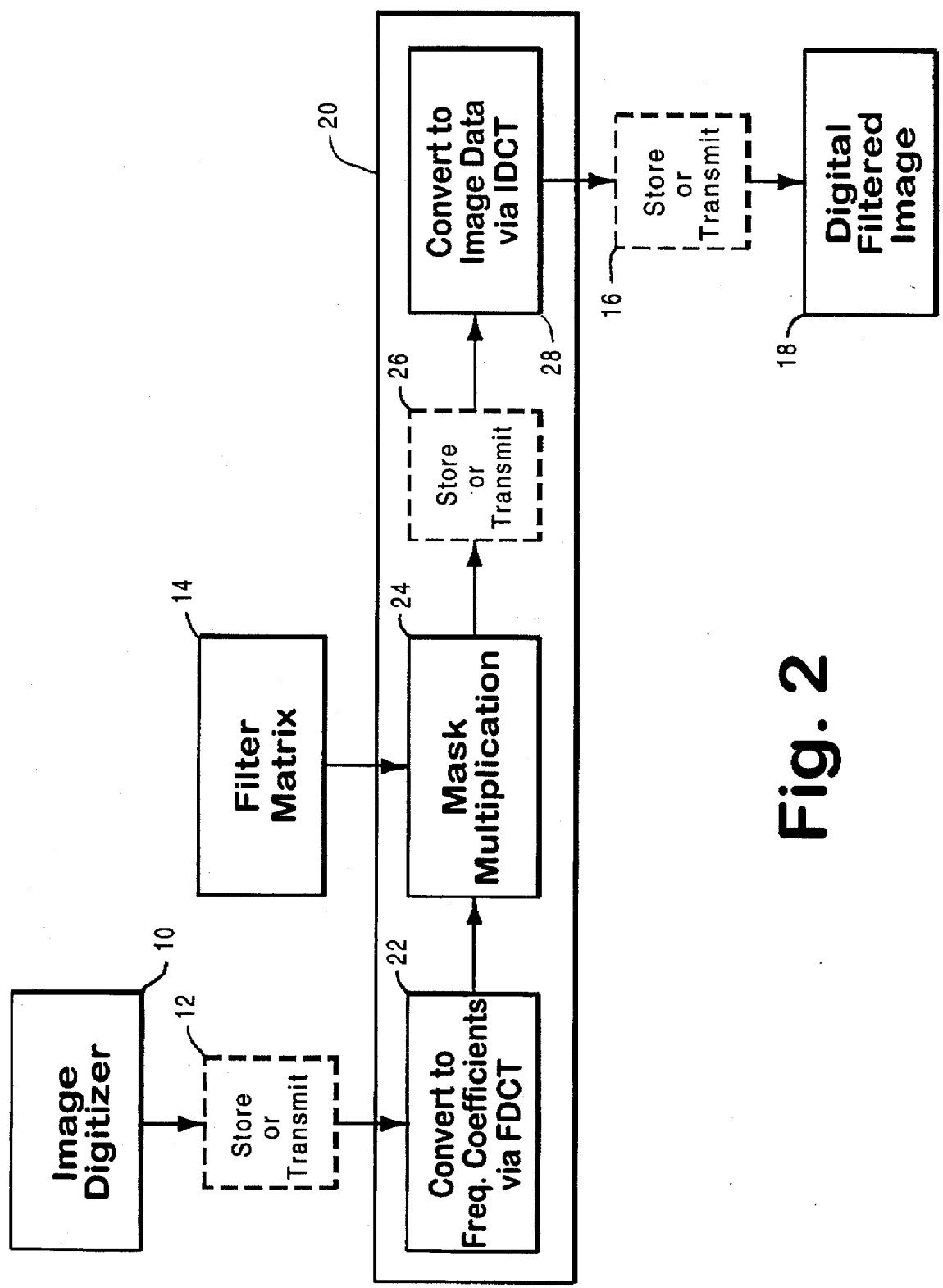
FIG. 2 is a block diagram illustrating the functional relationship between a source image, an image filtering apparatus according to the present invention, and an output filtered image.

The filtering function performed by image filtering unit 3 can also be accomplished by means of a much smaller unit, such as an electronic module, emplaced within any of the optical scanner 4, the video camera 5, the monitor 7, or the printing device 9. FIG. 2 is a block diagram illustrating the functional relationship between an image digitizer 10, a digital filtered image 18, and an interposed image filtering module 20. Shown within the block representing image filtering module 20 are generalized operations which are executed by image filtering module 20 in performing image filtering.

A digital source image is generated from an original source image by means of image digitizer 10, which can be a device such as a video camera, a digital still camera, or an optical scanner. The image data terms comprising the digital source image are provided to image filtering module 20 where filtering is performed to yield filtered image data terms from which digital filtered image 18 can be reconstructed. Digital filtered image 18 can be converted into a display provided by a panel or CRT, or produced as a hard copy via a printing device. If desired, the filtered image data terms can be sent to an output storage/transmittal unit 16 before being reconstructed into digital filtered image 18.

The type of filtering performed on the original source image is determined by the characteristics of a k×k filter matrix 14 used in conjunction with image filtering module 20. Filter matrix 14 can be provided externally, as shown, or stored within image filtering module 20 for use as needed. Alternatively, the digital source image may have been provided to image filtering module 20 from an input storage/transmittal unit 12. Input storage/transmittal unit 12, for example, may comprise a solid-state memory, a storage medium such as a floppy disc, or an electronic transmittal device such as a facsimile machine or a modem.

Image filtering module 20 operates by first converting the image data terms provided by image digitizer 10 into frequency coefficient terms by means of a forward orthogonal transformation, such as an FDCT, at operation 22. The frequency coefficient terms are mask multiplied by frequency filter terms derived from filter matrix 14, at operation 24, to produce filtered frequency coefficient terms. The filtered frequency coefficient terms are converted into filtered image data terms by means of an inverse orthogonal transformation, such as an IDCT, at operation 28. Alternatively, the filtered frequency coefficient terms may have been provided by a storage/transmittal unit 26 before application of the IDCT.

The operations performed by image filtering module 20 can be described in more detail with reference to FIG. 3. The digital source image is provided to image filtering module 20 as a source image-data set 30. Source image-data set 30 is most commonly configured as an H×V matrix of image data terms denoted by $d(s,r)$ where $0 \leq r \leq H-1$ and $0 \leq s \leq V-1$. Alternatively, source image-data set 30 can be subdivided and formatted into a two-dimensional array of N×N image-data blocks. From either format, source image-data set 30 is overlap transformed into a set of N×N frequency-coefficient matrices 33 by the application of a scaled FDCT, at operation 51. Operation 51, which makes use of an overlap parameter 13, is described in greater detail in the 'Overlapping and Forward Transformation' section below.

Each frequency-coefficient matrix 33 is mask multiplied with an N×N descaled frequency filter matrix 34, at operation 52, to yield an N×N filtered coefficient matrix 35. Descaled frequency filter matrix 34 is derived from filter matrix 14 by a process described in the 'Descaled Frequency Filter Matrix Derivation' section below. A pruned scaled IDCT is applied to filtered coefficient matrix 35, at operation 53, to yield filtered image data terms comprising an N'×N' filtered image-data matrix 37, where N'<N. In the disclosed method and apparatus, use of the pruned scaled IDCT eliminates redundant terms introduced by the overlapping procedure of operation 51 and correspondingly reduces the computational resources required for derivation of filtered image-data matrix 37. Application of the pruned scaled IDCT is described in the 'Application of the Pruned Scaled IDCT' section below.

Overlapping and Forward Transformation

Figure 4:
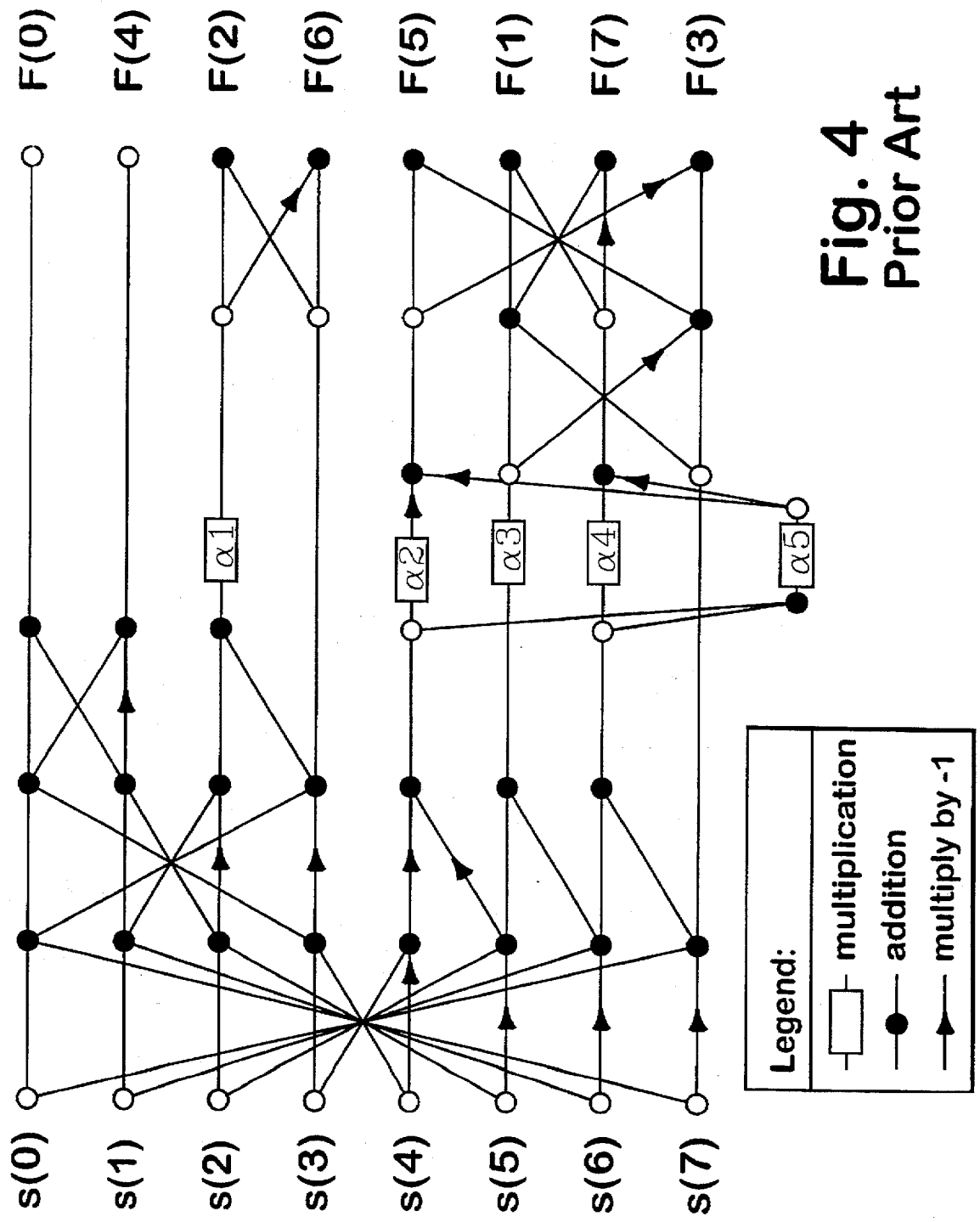
FIG. 4 is a flowgraph for a conventional scaled 8-point FDCT.

Image filtering module 20 transforms source image-data set 30 into a series of frequency-coefficient matrices 33 by a process of generating overlapped image-data matrices and applying a scaled forward orthogonal transformation to each overlapped image-data matrix. In a preferred embodiment, 8×8 overlapped image-data matrices are generated and the 8-point scaled FDCT developed by Arai is used for transforming the overlapped image-data matrices into frequency-coefficient matrices. The flowgraph for the 8-point scaled Arai transform is provided in FIG. 4. Values for the multiplication parameters $\alpha_1$ through $\alpha_5$ used in the Arai transform are listed in Table I.

TABLE I

| 8-Point FDCT Multiplication Parameters | |
|---|---|
| $\alpha_1$ | 0.707106718 |
| $\alpha_2$ | 0.541196100 |
| $\alpha_3$ | 0.707106718 |
| $\alpha_4$ | 1.306562963 |
| $\alpha_5$ | 0.382683432 |

As an illustrative example, the steps taken in the process of generating overlapped image-data matrices and applying an FDCT are explained using 8×8 overlapped image-data matrices, an overlap parameter 13 of four image data terms, and a 640-pixel by 480-pixel digital source image having image data terms denoted by $d(s,r)$, where $0 \leq r \leq 639$ and $0 \leq s \leq 479$.

Step 1 A first 8×8 overlapped image-data matrix $OIM_{0,0}$ is obtained from the 640×480 digital source image in accordance with the relationship, $$OIM_{0,0} = \begin{bmatrix} d(0,0) & d(0,1) & \ldots & d(0,7) \\ d(1,0) & d(1,1) & \ldots & d(1,7) \\ \cdot & \cdot & & \cdot \\ \cdot & \cdot & & \cdot \\ \cdot & \cdot & & \cdot \\ d(7,0) & d(7,1) & \ldots & d(7,7) \end{bmatrix}$$

Step 2 Overlapped image-data matrix $OIM_{0,0}$ is transformed into an 8×8 frequency-coefficient matrix $FCM_{0,0}$ by application of an 8-point scaled FDCT.

Step 3 A second 8×8 overlapped image-data matrix $OIM_{0,1}$ is obtained from the 640×480 digital source image by taking image data terms from the same eight rows as matrix $OIM_{0,0}$, but displaced four columns to the right, in accordance with the relationship, $$OIM_{0,1} = \begin{bmatrix} d(0,4) & d(0,5) & \ldots & d(0,11) \\ d(1,4) & d(1,5) & \ldots & d(1,11) \\ \cdot & \cdot & & \cdot \\ \cdot & \cdot & & \cdot \\ \cdot & \cdot & & \cdot \\ d(7,4) & d(7,5) & \ldots & d(7,11) \end{bmatrix}$$

$$OIM_{1,0} = \begin{bmatrix} d(4,0) & d(4,1) & \ldots & d(4,7) \\ d(5,0) & d(5,1) & \ldots & d(5,7) \\ \cdot & \cdot & & \cdot \\ \cdot & \cdot & & \cdot \\ \cdot & \cdot & & \cdot \\ d(11,0) & d(11,1) & \ldots & d(11,7) \end{bmatrix}$$

Step 4 Overlapped image-data matrix $OIM_{0,1}$ is transformed into an 8×8 frequency-coefficient matrix $FCM_{0,1}$ by application of the 8-point scaled FDCT.

Step 5 Steps 3 and 4 are repeated for the remainder of the terms in rows 0 through 7 of the 640×480 digital source image.

Step 6 Steps 1 through 5 are repeated using rows 4 through 7 to produce a series of matrices beginning with a first 8×8 overlapped image-data matrix $OIM_{1,0}$ in accordance with the relationship, $$OIM_{1,0} = \begin{bmatrix} d(4,0) & d(4,1) & \ldots & d(4,7) \\ d(5,0) & d(5,1) & \ldots & d(5,7) \\ \cdot & \cdot & & \cdot \\ \cdot & \cdot & & \cdot \\ \cdot & \cdot & & \cdot \\ d(11,0) & d(11,1) & \ldots & d(11,7) \end{bmatrix}$$

and continuing to an 8×8 overlapped image-data matrix $OIM_{1,158}$ in accordance with the relationship, $$OIM_{1,158} = \begin{bmatrix} d(4,632) & d(4,633) & \ldots & d(4,639) \\ d(5,632) & d(5,633) & \ldots & d(5,639) \\ \cdot & \cdot & & \cdot \\ \cdot & \cdot & & \cdot \\ \cdot & \cdot & & \cdot \\ d(11,632) & d(11,633) & \ldots & d(11,639) \end{bmatrix}$$

Step 7 Step 6 is repeated for the remaining rows of the 640×480 digital source image. The overlapping process produces a final 8×8 overlapped image-data matrix $OIM_{118,158}$ in accordance with the relationship, $$OIM_{118,158} = \begin{bmatrix} d(472,632) & d(472,633) & \ldots & d(472,639) \\ d(473,632) & d(473,633) & \ldots & d(473,639) \\ \cdot & \cdot & & \cdot \\ \cdot & \cdot & & \cdot \\ \cdot & \cdot & & \cdot \\ d(479,632) & d(479,633) & \ldots & d(479,639) \end{bmatrix}$$

In the embodiment described above, the overlapping operation proceeded along an entire eight-row portion of the 640×480 digital source image before operating on the adjacent eight-row portion located four rows down in the digital source image. In an alternative embodiment, the overlapping operation proceeds along an entire eight-column portion of the 640×480 digital source image before accessing an adjacent eight-column portion. In the alternative embodiment, step 3 through 7 are performed as follows:

Alternative step 3 A second 8×8 overlapped image-data matrix $OIM_{1,0}$ is obtained from the 640×480 digital source image by taking image data terms from the same eight columns as matrix $OIM_{0,0}$, but displaced downward four rows, in accordance with the relationship, Alternative step 4 Overlapped image-data matrix $OIM_{1,0}$ is transformed into an 8×8 frequency-coefficient matrix $FCM_{1,0}$ by application of the 8-point scaled FDCT.

Alternative step 5 Alternative steps 3 and 4 are repeated for the remainder of the terms in columns 0 through 7 of the 640×480 digital source image.

Alternative step 6 Steps 1 and 2, and alternative steps 3 through 5 are repeated using columns 4 through 7 to produce a series of matrices beginning with a first 8×8 overlapped image-data matrix $OIM_{0,1}$ in accordance with the relationship, $$OIM_{0,1} = \begin{bmatrix} d(0,4) & d(0,5) & \ldots & d(0,11) \\ d(1,4) & d(1,5) & \ldots & d(1,11) \\ \cdot & \cdot & & \cdot \\ \cdot & \cdot & & \cdot \\ \cdot & \cdot & & \cdot \\ d(7,4) & d(7,5) & \ldots & d(7,11) \end{bmatrix}$$

and continuing to an 8×8 overlapped image-data matrix $OIM_{118,1}$ in accordance with the relationship, $$OIM_{118,1} = \begin{bmatrix} d(472,4) & d(472,5) & \ldots & d(472,11) \\ d(473,4) & d(473,5) & \ldots & d(473,11) \\ \cdot & \cdot & & \cdot \\ \cdot & \cdot & & \cdot \\ \cdot & \cdot & & \cdot \\ d(479,4) & d(479,5) & \ldots & d(479,11) \end{bmatrix}$$

Alternative step 7 Alternative step 6 is repeated for the remaining columns of the 640×480 digital source image. The overlapping process produces a final 8×8 overlapped image-data matrix $OIM_{118,158}$ in accordance with the relationship, $$OIM_{118,158} = \begin{bmatrix} d(472,632) & d(472,633) & \ldots & d(472,639) \\ d(473,632) & d(473,633) & \ldots & d(473,639) \\ \cdot & \cdot & & \cdot \\ \cdot & \cdot & & \cdot \\ \cdot & \cdot & & \cdot \\ d(479,632) & d(479,633) & \ldots & d(479,639) \end{bmatrix}$$

It can be seen that both overlapping methods described above yield the same resultant overlapped image-data matrices. It can also be seen that either overlapping method introduces redundant image data terms because each successively-generated matrix contains image data terms which also appear in at least one other previously-generated matrix. These redundant terms are eliminated in a subsequent operation as described in the 'Application of the Pruned Scaled IDCT' section below.

The 8×8 overlapped image-data matrices $OIM_{q,p}$ generated by either process described above can also be represented in shorthand notation by the expression, $$OIM_{q,p} = \begin{bmatrix} d(0+q\omega, 0+p\omega) & \ldots & d(0+q\omega, 7+p\omega) \\ \cdot & & \cdot \\ \cdot & & \cdot \\ \cdot & & \cdot \\ d(7+q\omega, 0+p\omega) & \ldots & d(7+q\omega, 7+p\omega) \end{bmatrix}$$

If we denote the image data terms s(j,i) in matrix $OIM_{q,p}$ by $s_{q,p}(j,i)$, the above expression can be simplified to, $$s_{q,p}(j,i)=d(j+q\omega,i+p\omega)$$

where $0 \leq i+p\omega \leq H-1$, $0 \leq j+q\omega \leq V-1$, and $\omega$ is overlap parameter 13. In a preferred embodiment, $\omega$ is determined by the size of the filter matrix 14, as explained in the 'Descaled Frequency Filter Matrix Derivation' section below.

Figure 5:
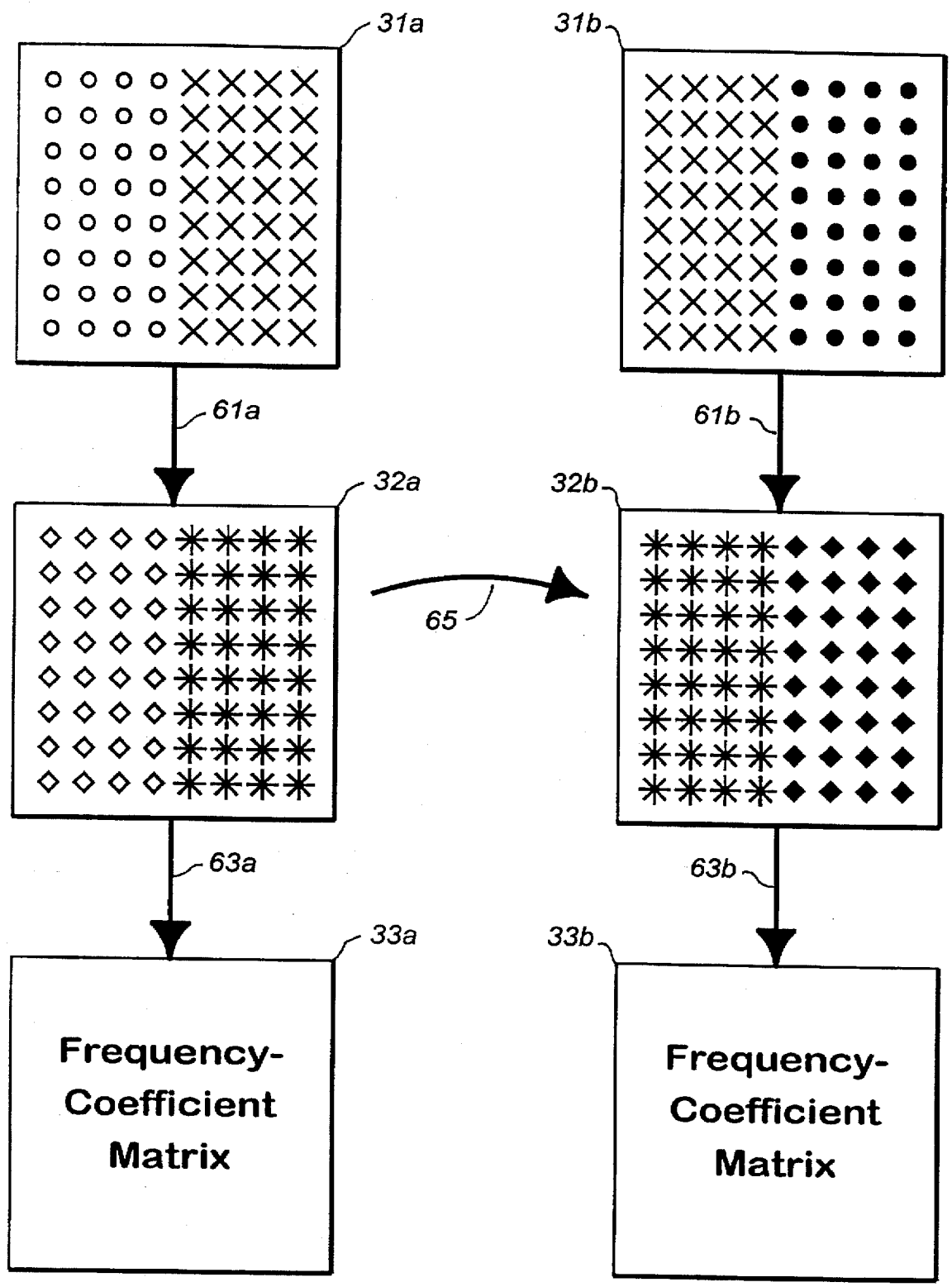
FIG. 5 is a diagram illustrating the reduction of computational steps achieved in the application of an FDCT according to the present invention.

The forward transformation of the 8×8 overlapped image-data matrices $OIM_{q,p}$ can best be shown with reference to FIG. 5 in which are shown overlapped image-data matrices 31a and 31b, which represent two successively-generated matrices produced in accordance with the first embodiment of the overlapping method described above. Matrix 31a comprises sixty-four image data terms $s_{31a}(j,i)$ and matrix 31b comprises sixty-four image data terms $s_{31b}(j,i)$ where $0 \leq i,j \leq 7$. Both matrices have an overlap of four columns of image data terms in common with each other. The image data terms comprising the four leftmost columns of overlapped image-data matrix 31b, represented by X's, are the same terms comprising the four rightmost columns of matrix 31a. That is, $s_{31b}(j,i)=s_{31a}(j,i+4)$ for $0 \leq i \leq 3$ and $0 \leq j \leq 7$.

Image-data matrix 31a is transformed into a frequency-coefficient matrix 33a by means of a two-dimensional 8×8 FDCT executed as a sequence of two 8-point cosine transforms. A first 8-point FDCT is applied to the columns of image-data matrix 31a, at operation 61a, to yield an intermediate frequency-coefficient matrix 32a in accordance with the equation, $$\tilde{S}(v) = \sqrt{\frac{2}{8}} \sum_{j=0}^{7} C_v s(j,i) \cos\left[(2j+1)\frac{v\pi}{16}\right]$$

where $\tilde{S}(v)$ are intermediate terms in the v-th column of intermediate frequency-coefficient matrix 32a. This expression can also be written in shorthand notation as, $$[FCM_{32a}]=C \times [FCM_{31a}]$$

where $[FCM_{32a}]$ is intermediate coefficient matrix 32a, $[FCM_{31a}]$ is image-data matrix 31a, and C is the basis matrix defined above. In the example provided, the four leftmost columns of matrix 31a, comprising the terms represented by open circles, become upon transformation the four leftmost columns of matrix 32a, comprising the terms represented by open diamonds. The four rightmost columns of matrix 31a comprising the terms represented by X's, become upon transformation the four rightmost columns of matrix 32a, comprising the terms represented by asterisks.

The transpose of the 8-point FDCT is applied to the rows of intermediate frequency-coefficient matrix 32a, at operation 63a, to produce frequency-coefficient matrix 33a. This transform operation can be represented in shorthand notation as, $$[FCM_{33a}]=[FCM_{32a}] \times C^T$$

where $[FCM_{33a}]$ is frequency-coefficient matrix 33a and $C^T$ is the transpose of the basis matrix, as defined above.

In a conventional method of transforming intermediate frequency coefficient matrices, successively-generated matrix 31b is transformed into an intermediate matrix 32b in the same manner as the above-described method of obtaining matrix 32a. The first FDCT is applied to the columns of overlapped image-data matrix 31b, at operation 61b, to yield an overlapped intermediate frequency-coefficient matrix 32b. The four leftmost columns of matrix 31b, comprising the terms represented by X's, become upon transformation the four leftmost columns of matrix 32b comprising the terms represented by asterisks. The four rightmost columns of matrix 31b become, upon transformation, the four rightmost columns of matrix 32b comprising terms represented by solid diamonds. The transpose of the 8-point FDCT is applied to the rows of matrix 32b, at operation 63b, to produce an overlapped frequency-coefficient matrix 33b.

In the disclosed method of transforming intermediate frequency-coefficient matrices, the transformation process is made more efficient by recognizing that the terms in columns 0 through 3 of matrix 32b are identical to the terms in columns 4 through 7 of matrix 32a. That is, $\tilde{S}_{32b}(v) = \tilde{S}_{32a}(v+4)$ for $0 \leq v \leq 3$ where $\tilde{S}_{32b}(v)$ is an intermediate term in the i-th column of matrix 32b. Accordingly, it can be appreciated that after the terms comprising columns 4 through 7 of matrix 32a have been derived, they need not be recomputed but can be stored in memory and retrieved, at operation 65, when matrix 33b is being derived. The storage and retrieval process is repeated for successive overlapped image-data matrices. This process reduces, by approximately 25%, the computation necessary in the transformation of overlapped image-data matrices 31b into overlapped frequency-coefficient matrices 33b in comparison to the conventional method in which all intermediate matrix terms are computed as needed.

Alternatively, matrices 31a and 31b may reside in the same array column and have four rows of terms in common. That is, $\tilde{S}_{32b}(\mu)=\tilde{S}_{32a}(\mu+4)$ for $0 \leq \mu \leq 3$). In this case, the efficient transformation procedure would be practiced by applying the one-dimensional FDCT first to the rows of each image-data matrix and then to the columns of the resulting intermediate matrix. The terms in the common four rows of the appropriate intermediate coefficient matrix would then be stored and retrieved for derivation of the appropriate frequency-coefficient matrix.

Descaled Frequency Filter Matrix Derivation

Figure 3:
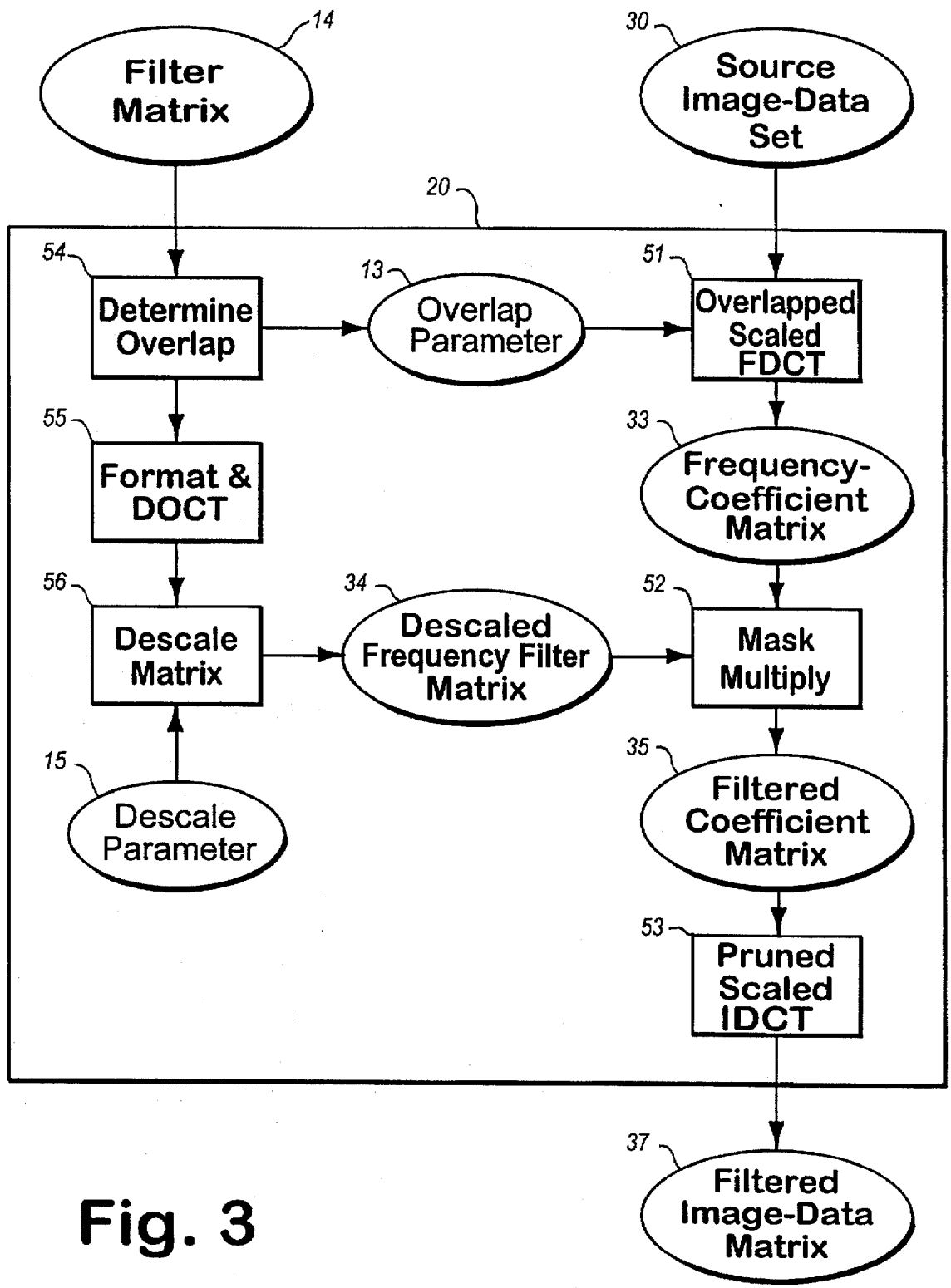
FIG. 3 is a diagram illustrating the operations performed by the image filtering apparatus of FIG. 2.

Descaled frequency filter matrix 34 is derived from k×k filter matrix 14, as shown in FIG. 3, by means of the following operations:

1. The lower right k'×k' quadrant of filter matrix 14 is formatted into an interim matrix, where $$k' = int\left\lfloor \frac{k+1}{2} \right\rfloor.$$

The interim matrix is formatted into an N×N spatial-domain filter matrix with terms f(n,m) by one of the following processes: i) padding the interim matrix with (N−k') right-hand columns and (N−k') lower rows of zeroes if the quadrant is smaller than N×N, ii) deleting (k'−N) right-hand rows and (k'−N) lower columns of the interim matrix if the quadrant is larger than N×N, or iii) neither padding nor deleting terms if the quadrant is N×N, and using the interim matrix as the spatial-domain filter matrix;

2. The spatial-domain filter terms in the N×N matrix are transformed into frequency-domain filter terms by the application of a discrete odd-cosine transformation (DOCT), at operation 55;

3. The frequency-domain filter terms are descaled, at operation 56, to produce descaled frequency filter matrix 34. Descale parameters 15 are selected to compensate for the FDCT scaling, at operation 51, and the IDCT scaling, at operation 53.

The 8×8 discrete-odd cosine transform (DOCT) is given by, $$Fd(v,\mu) = 4 \sum_{j=0}^{7} \sum_{i=0}^{7} d_i d_j f(j,i) \cos\left[\frac{v i \pi}{8}\right] \cos\left[\frac{\mu j \pi}{8}\right]$$

where $Fd(v,\mu)$ is a frequency-domain filter matrix, $d_i, d_j = 1$ for $i,j=0$, and $d_i, d_j = 2$ for $i,j>0$. In shorthand notation, the above expression can be expressed as, $$[Fd(v,\mu)] = D_O \times [f(j,i)] \times D_O^T$$

where $D_O$ is the basis matrix given by, $$\begin{bmatrix} 1.0 & 2.0 & 2.0 & 2.0 & 2.0 & 2.0 & 2.0 & 2.0 \\ 1.0 & 1.8 & 1.4 & 0.7 & 0.0 & -0.7 & -1.4 & -1.8 \\ 1.0 & 1.4 & 0.0 & -1.4 & -2.0 & -1.4 & 0.0 & 1.4 \\ 1.0 & 0.7 & -1.4 & -1.8 & 0.0 & 1.8 & 1.4 & -0.7 \\ 1.0 & 0.0 & -2.0 & 0.0 & 2.0 & 0.0 & -2.0 & 0.0 \\ 1.0 & -0.7 & -1.4 & 1.8 & 0.0 & -1.8 & 1.4 & 0.7 \\ 1.0 & -1.4 & 0.0 & 1.4 & -2.0 & 1.4 & 0.0 & -1.4 \\ 1.0 & -1.8 & 1.4 & -0.7 & 0.0 & 0.7 & -1.4 & 1.8 \end{bmatrix}$$

At operation 54, the overlap parameter 13 used in performing the overlapping of image-data matrices, at operation 51, is determined from the relationship, $$\omega = k - 1$$

where $\omega$ is the overlap parameter and k is the size of filter matrix 14. For example, given a 5×5 filter matrix 14 and 8×8 image-data matrices, the preferred overlap is four image data terms, or a 50% overlap,.

Application of the Pruned Scaled IDCT

Figure 6:
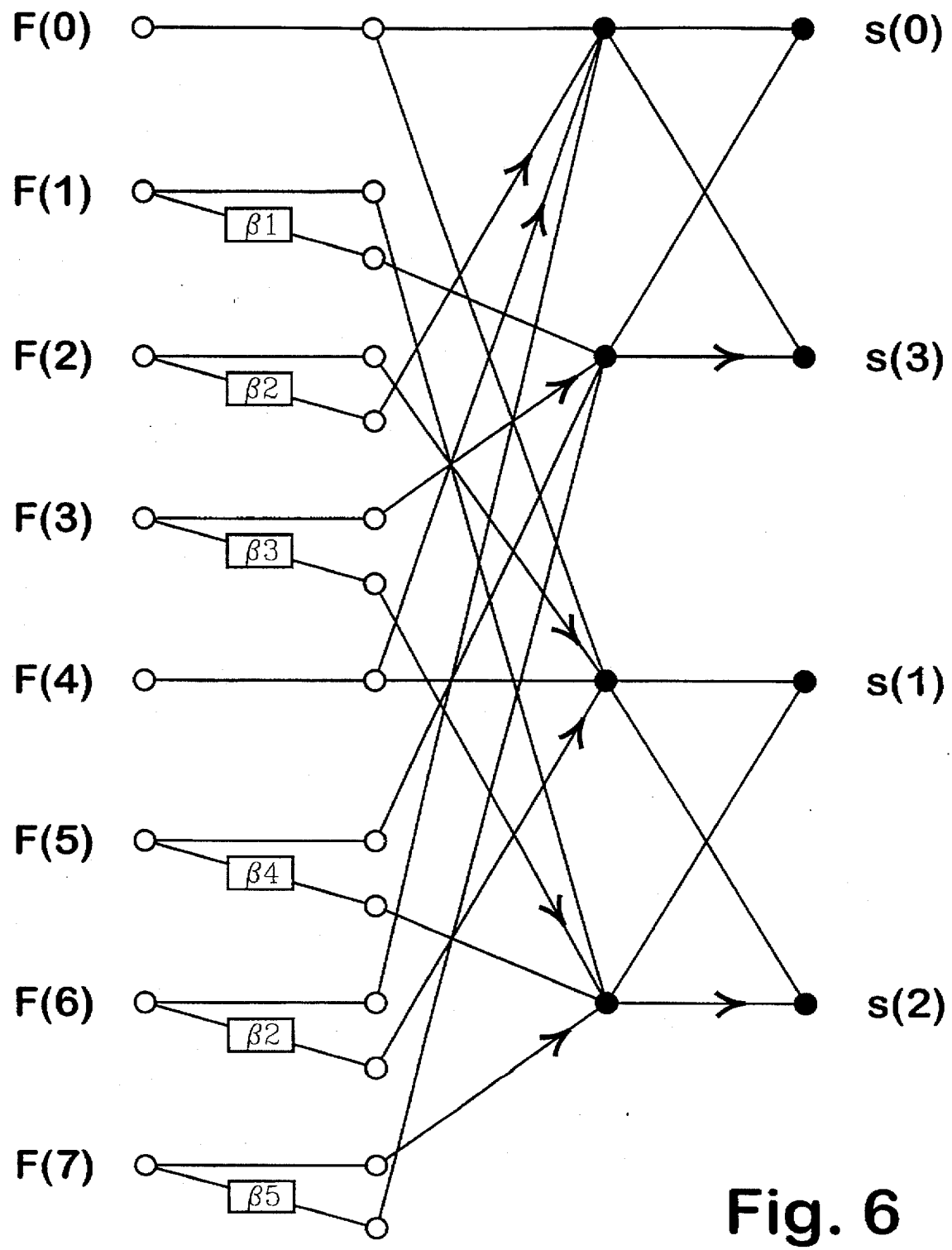
FIG. 6 is a flowgraph for a scaled pruned 8-point IDCT according to the present invention.

Filtered image-data matrix 37 is obtained by the application of an efficient pruned scaled IDCT to filtered coefficient matrix 35, at operation 53. A flowgraph for an 8-point IDCT used for 8×8 image-data matrices, in which only six multiplications and sixteen additions are needed, is shown in FIG. 6. Values for the multiplication parameters $\beta_1$ through $\beta_5$ are listed in Table II.

TABLE II

| 8-Point IDCT Multiplication Parameters | |
|---|---|
| $\beta_1$ | 2.8477590 |
| $\beta_2$ | 0.4142136 |
| $\beta_3$ | 0.5664545 |
| $\beta_4$ | 4.2619724 |
| $\beta_5$ | 0.8477691 |

F(0) through F(7) represent the eight frequency coefficient terms appearing in the same row or the same column of image-data matrix 35. Application of the pruned scaled IDCT yields four image data terms denoted by s(0), s(1), s(2), and s(3).

The pruned scaled IDCT is applied to each column of filtered coefficient matrix 35, at operation 53a, to yield a 4×8 intermediate filtered image-data matrix 36 as shown in FIG. 7. Only four intermediate filtered terms, represented by asterisks, are computed for each column of matrix 36. The transpose of the pruned scaled IDCT is applied to the eight intermediate filtered terms in each of the four rows of matrix 36, at operation 53b, to yield 4×4 filtered image-data matrix 37 comprising sixteen filtered image data terms, represented by X's. In an alternative procedure, the IDCT can be applied by X's to the rows of filtered coefficient matrix 35, and the IDCT transpose to the columns of an intermediate processed image-data matrix to obtain the filtered image-data matrix 37.

In comparison, an equivalent conventional method, such as an 'overlap-save' method, requires a larger number of computations. In the overlap-save method, the IDCT is applied to a frequency coefficient matrix 41, at operation 42, to yield a conventional intermediate matrix 43 comprising sixty-four terms as shown in FIG. 8. The transpose of the IDCT is subsequently applied to the sixty-four intermediate terms, at operation 44, to yield a conventional filtered image-data matrix 45 comprising sixty-four image data terms of which forty-eight terms, represented by phantom X's, are discarded. The image data terms $sv_{45}(j,i)$ comprising filtered image-data matrix 45 are related to the terms $Fc_{41}(v,\mu)$ comprising filtered coefficient matrix 41 by the expression, $sv_{45}(j,i) = Js^T \times Fc_{41}(v,\mu) \times Js$, where Js is the IDCT. A processed image-data submatrix 47, comprising the sixteen terms represented by solid X's, is retained. The terms $sf_{47}(z,y)$ comprising processed image-data submatrix 47 are related to the terms $sv_{45}(j,i)$ comprising filtered image-data matrix 45 by the expression $sf_{47}(z,y) = sv_{45}(j+2,i+2)$, where $0 \leq y, z \leq 3$. It can be appreciated that the computational resources utilized in computing the discarded terms are not expended in the preferred method shown in FIG. 7.

16-Point DCT Transform

Figure 9A:
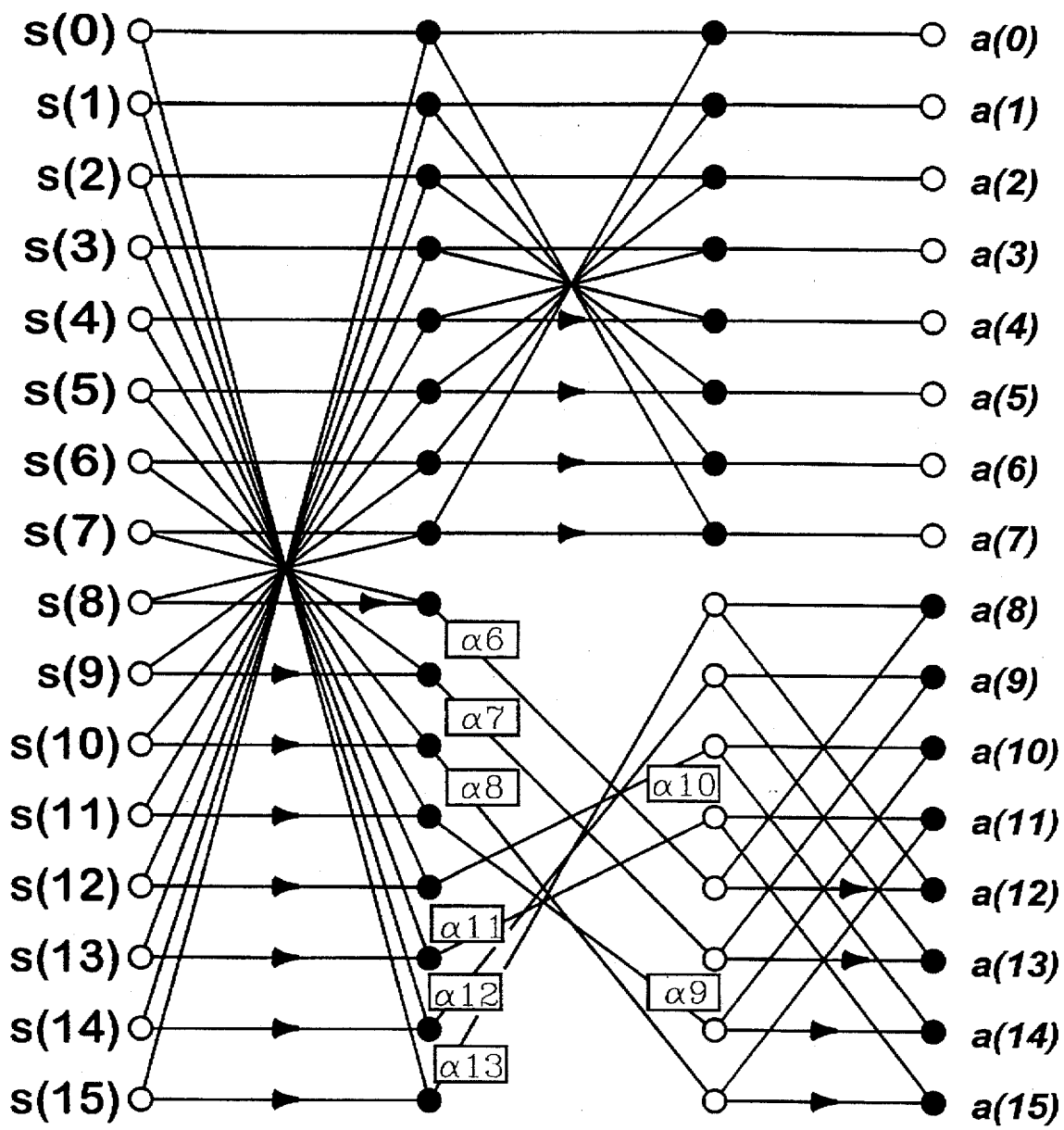
FIGS. 9A through 9C illustrate a flowgraph for a scaled 16-point FDCT according to the present invention.
Figure 9B:
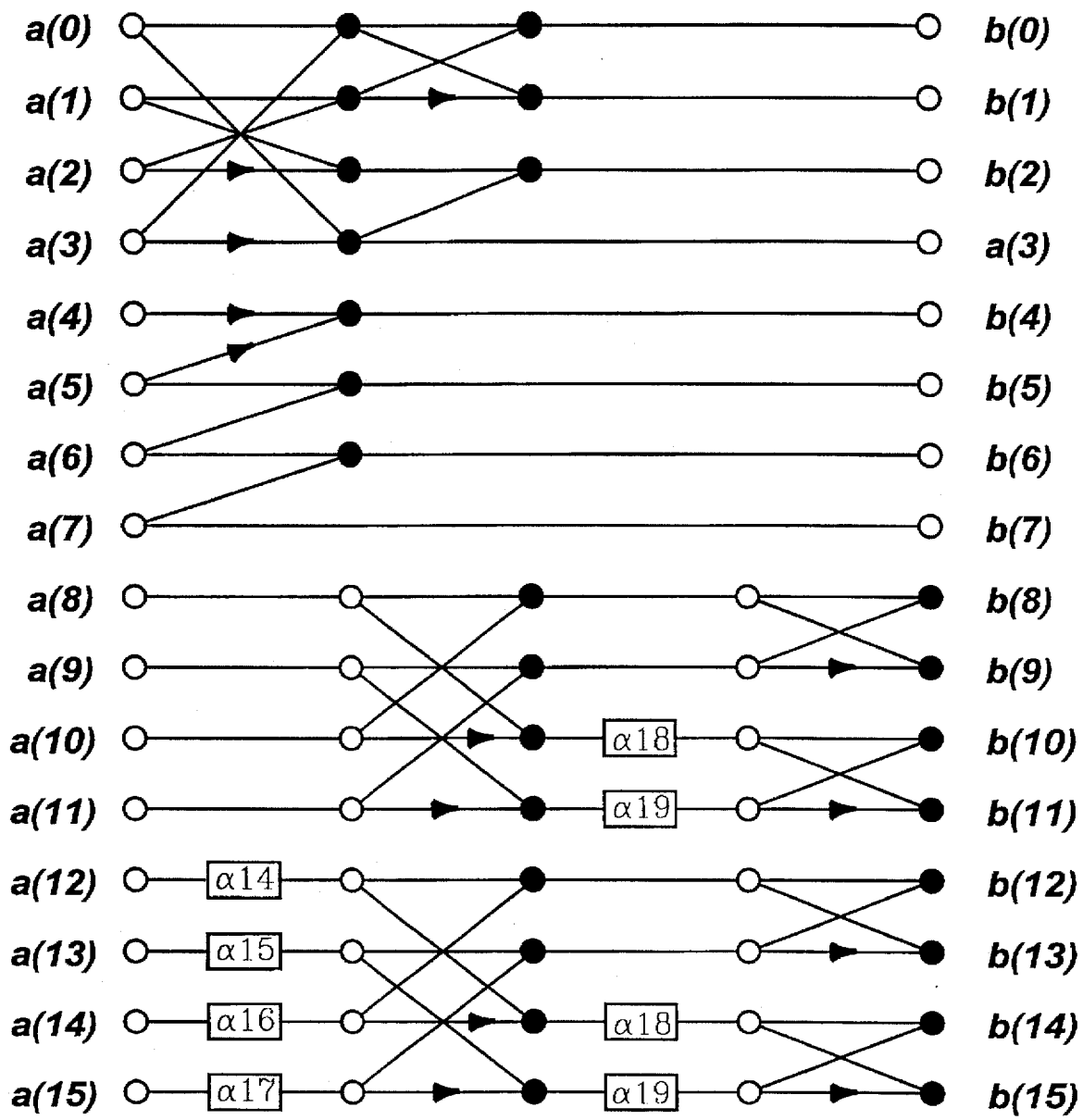
Figure 9C:
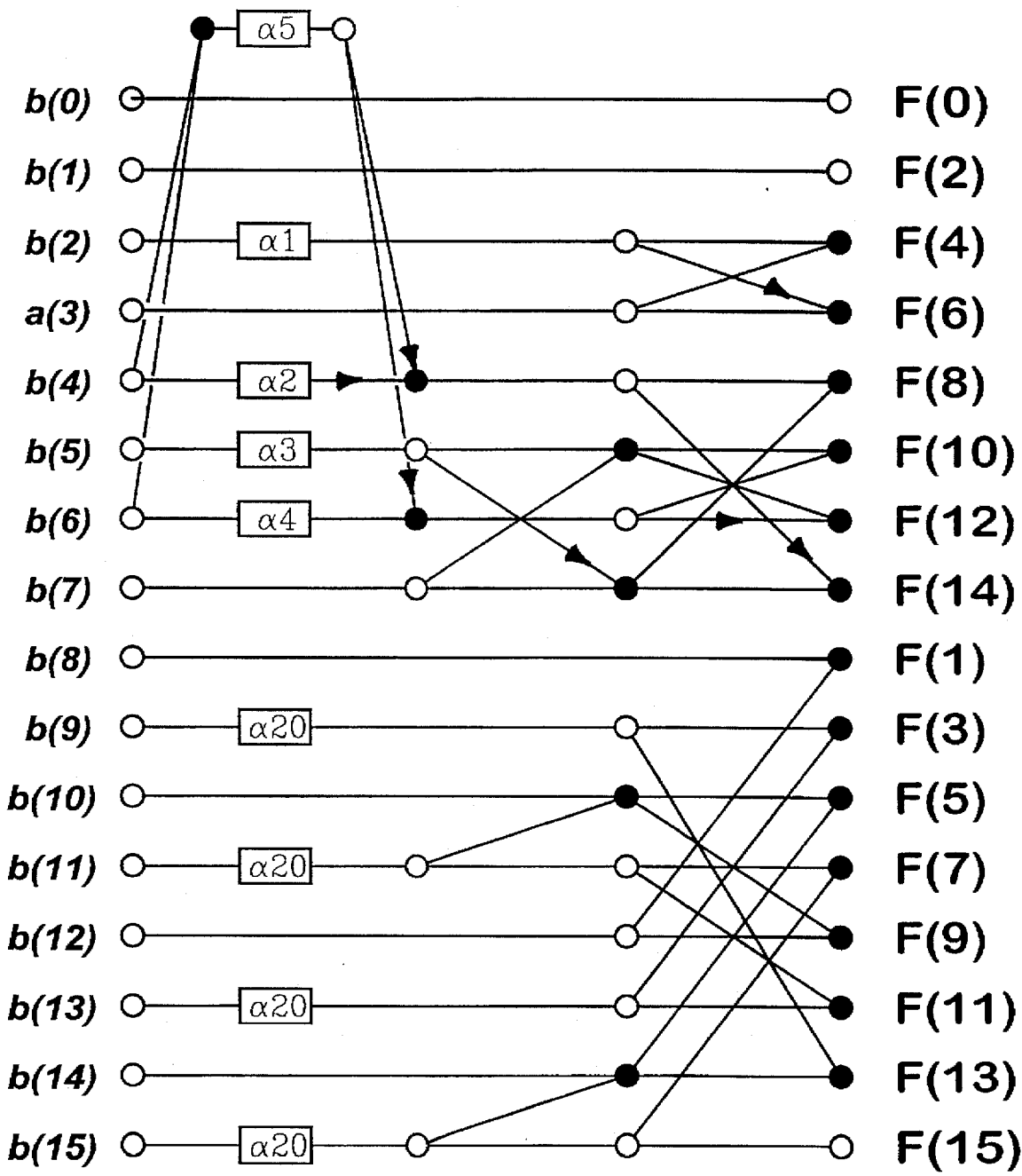

For image filtering applications in which 16×16 image-data matrices are used, a 16-point scaled transform having the flowgraph of FIGS. 9A through 9C is applied at operation 51 to yield a 16×16 frequency-coefficient matrix 33. Values for the multiplication parameters $\alpha_1$ through $\alpha_5$ are listed in Table I, and values for the multiplication parameters $\alpha_6$ through $\alpha_{20}$ are listed in Table III.

TABLE III

| 16-Point FDCT Multiplication Parameters | | | |
|---|---|---|---|
| $\alpha_6$ | 0.5024193 | $\alpha_7$ | 0.5224986 |
| $\alpha_8$ | 0.5669440 | $\alpha_9$ | 0.6468217 |
| $\alpha_{10}$ | 0.7881546 | $\alpha_{11}$ | 1.0606777 |
| $\alpha_{12}$ | 1.7224471 | $\alpha_{13}$ | 5.1011486 |
| $\alpha_{14}$ | 5.1011486 | $\alpha_{15}$ | 0.6013449 |
| $\alpha_{16}$ | 2.5629154 | $\alpha_{17}$ | 0.8999762 |
| $\alpha_{18}$ | 0.5411961 | $\alpha_{19}$ | 1.3065630 |
| $\alpha_{20}$ | 0.7071068 | | |

The disclosed 16-point scaled transform has been developed from concepts first presented in the reference technical article, "A new algorithm to compute the discrete cosine transform," by B. G. Lee and has been modified to derive the even-index frequency terms by means of the 8-point transform developed by Arai.

Figure 10A:
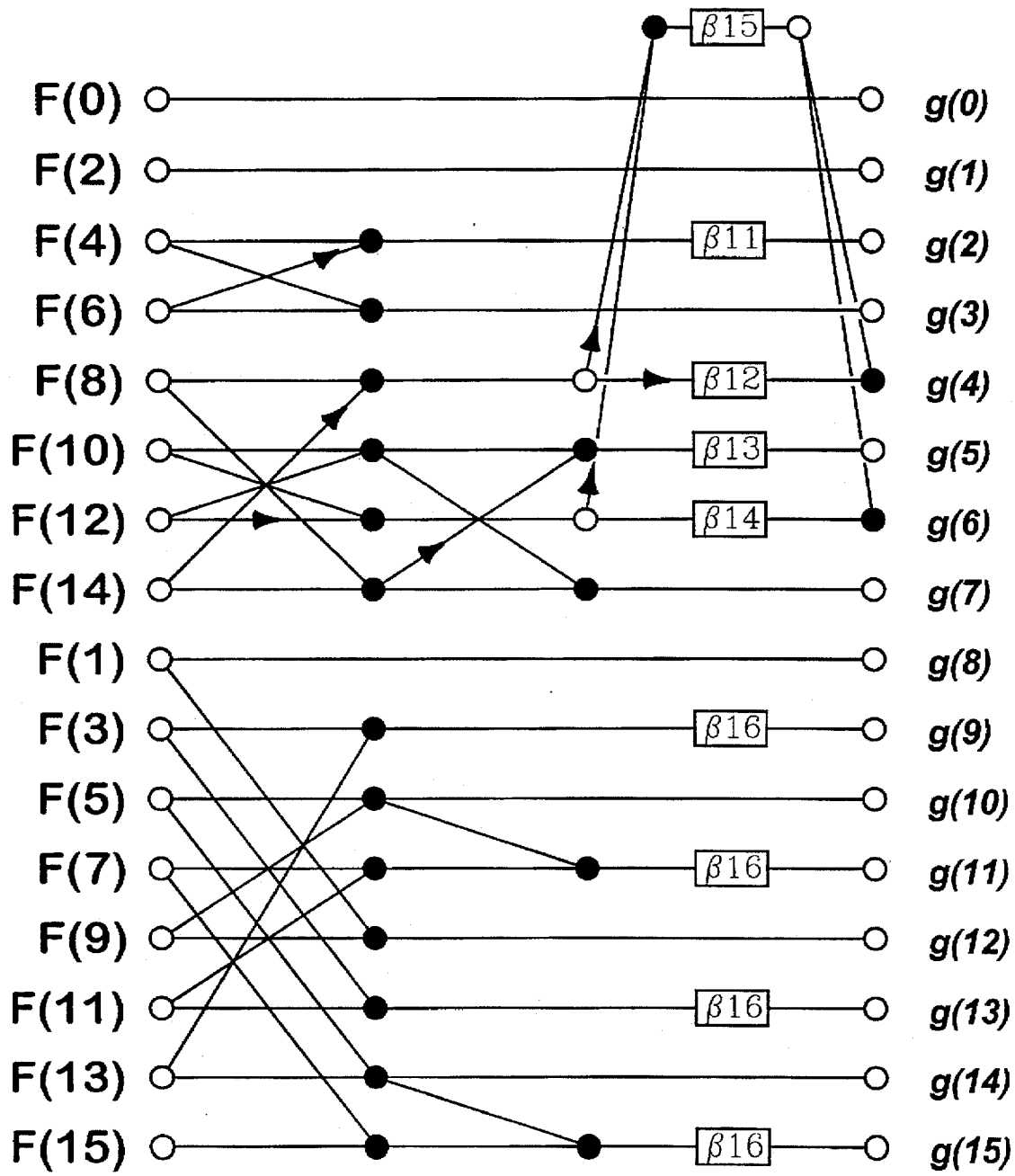
FIGS. 10A through 10C illustrate a flowgraph for a scaled pruned 16-point IDCT according to the present invention.
Figure 10B:
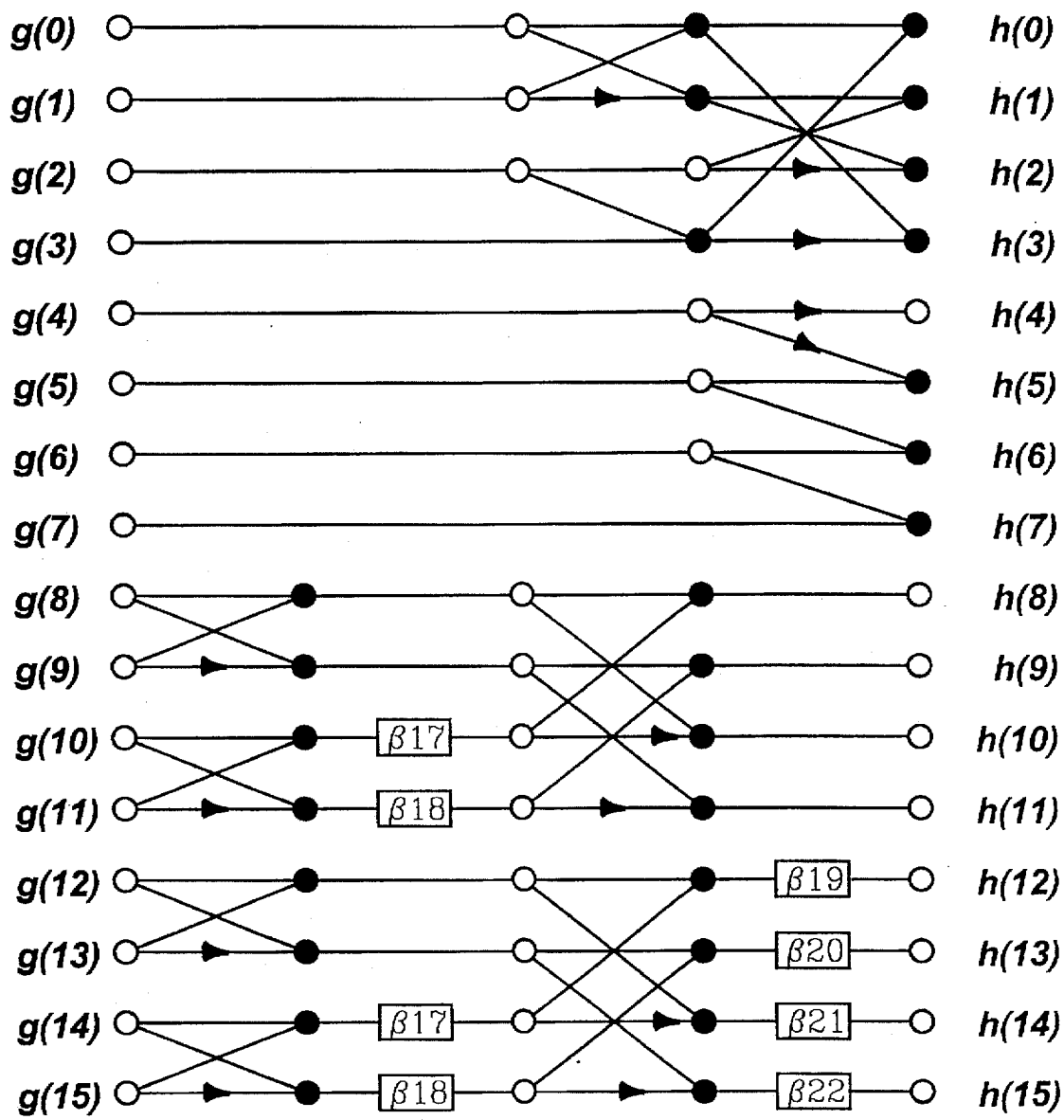
Figure 10C:
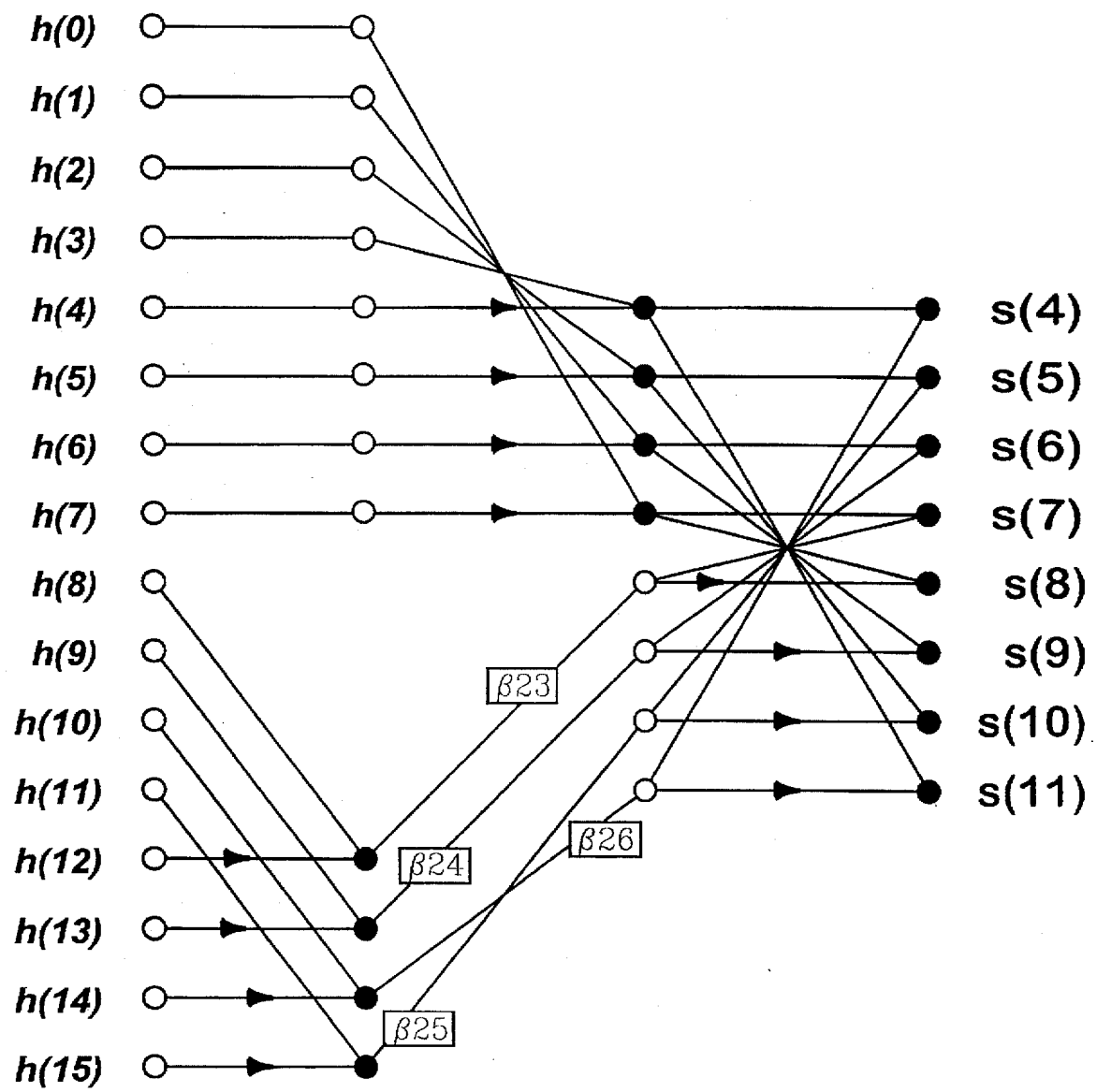

For image filtering applications in which 16×16 filtered coefficient matrices are produced, a 16-point scaled pruned IDCT having the flowgraph of FIGS. 10A through 10C is applied, at operation 53, to obtain a 16×16 filtered image-data matrix 37. Values for the multiplication parameters $\beta_{11}$ through $\beta_{26}$ are listed in Table IV.

TABLE IV

16-Point IDCT Multiplication Parameters

| | | | |
|---|---|---|---|
| $\beta_{11}$ | 1.4142136 | $\beta_{12}$ | 2.6131259 |
| $\beta_{13}$ | 1.4142136 | $\beta_{14}$ | 1.0823922 |
| $\beta_{15}$ | 0.7653669 | $\beta_{16}$ | 0.7071068 |
| $\beta_{17}$ | 0.5411961 | $\beta_{18}$ | 1.3065630 |
| $\beta_{19}$ | 5.1011486 | $\beta_{20}$ | 0.6013449 |
| $\beta_{21}$ | 2.5629154 | $\beta_{22}$ | 0.8999762 |
| $\beta_{23}$ | 5.1011486 | $\beta_{24}$ | 1.7224471 |
| $\beta_{25}$ | 0.7881546 | $\beta_{26}$ | 1.0606777 |

The present invention is advantageously adapted to provide an apparatus which accomplishes the filtering of electrical image signals in a faster and more efficient method than is presently available in conventional image processing devices. While there have been described preferred embodiments of the present invention, it will be readily apparent to those skilled in the art that various changes and modifications may be made therein without departing from the invention, and it is intended in the wording of the appended claims to include such changes and modifications as would be encompassed by the true spirit and scope of the invention.

What is claimed is:

1. A method for applying an image filter to an image signal, the image signal provided as a series of electrical signals, each electrical signal corresponding to a characteristic of an element of a two-dimensional image, the image elements configured as a two-dimensional H×V array, and the image filter provided as a set of filter terms configured as a k×k filter matrix, said method comprising the steps of:

converting the series of electrical signals into a set of numerical values, each said numerical value quantitatively describing a feature characteristic of a corresponding image element, said numerical values further denoted by $d(s,r)$ where $0 \leq r \leq H-1$ and $0 \leq s \leq V-1$;

formatting said set of numerical values into a plurality of N×N overlapped image data matrices identified by indices 'p' and 'q', each said overlapped image-data matrix comprising image-data terms denoted by $s_{q,p}(j,i)$, each said image data term comprised of a said numerical value determined in accordance with the relationship;

$$s_{q,p}(j,i)=d(j+q\omega,i+p\omega)$$

where $0 \leq i,j \leq N-1$ and $\omega$ is an integer constant satisfying the condition $1 \leq \omega \leq N-1$;

transforming each said image-data matrix into an N×N frequency-coefficient matrix comprising scaled frequency-coefficient terms denoted by $S_{q,p}(v,\mu)$, said step of transforming each said image-data matrix accomplished by means of a scaled orthogonal transform Gs in accordance with the expression, $$S_{q,p}(v,\mu)=Gs \times s_{q,p}(j,i) \times Gs^T;$$

converting the k×k filter matrix into an N×N spatial-domain filter matrix comprising terms denoted by $f(j,i)$;

transforming said spatial-domain filter matrix into an N×N descaled frequency filter matrix comprising descaled frequency filter terms denoted by $Fd(v,\mu)$, said step of transforming said spatial-domain filter matrix accomplished by means of a descaled orthogonal transform Hs in accordance with the expression, $$Fd(v,\mu)=Hs \times f(j,i) \times Hs^T;$$

multiplying said descaled frequency filter matrix with each said frequency-coefficient matrix to produce at least one N×N filtered coefficient matrix comprising terms denoted by $Fc(v,\mu)$, said step of multiplying accomplished in accordance with the expression, $$Fc_{q,p}(v,\mu)=Fd(v,\mu) \times S_{q,p}(v,\mu);$$

inverse transforming each said filtered coefficient matrix into an N'×N' filtered image-data matrix comprising filtered image data terms, where N'<N, said step of inverse transforming accomplished by means of a pruned scaled inverse orthogonal transform Js; and converting said filtered image-data terms into a series of filtered electrical signals such that said filtered electrical signals can be configured into a two-dimensional H×V array of filtered image elements, each said filtered electrical signal corresponding to a characteristic of one said filtered image element.

2. The method of claim 1 wherein said step of converting the k×k filter matrix into an N×N spatial-domain filter matrix comprises the steps of: forming a k'×k' interim filter matrix from the lower right-hand quadrant of the filter matrix, where $$k' = int\left[\frac{k+1}{2}\right];$$

and forming said N×N spatial-domain filter matrix from said k'×k' interim filter matrix by one of the following three methods:

using said interim filter matrix as said spatial domain matrix if k'=N, deleting (k'−N) right-hand columns and (k'−N) bottom rows from said interim filter matrix if k'>N, or adding (N−k') right-hand columns of zeroes and (N−k') bottom rows of zeroes to said interim filter matrix if k'<N.

3. The method of claim 1 wherein said step of inverse transforming each said filtered coefficient matrix into an N'×N' filtered image-data matrix comprises the steps of:

inverse transforming each said filtered coefficient matrix into an N×N overlapped filtered image-data matrix having overlapped image data terms denoted by $sv_{q,p}(j,i)$ by means of said scaled inverse orthogonal transform Js in accordance with the expression, $$sv_{q,p}(j,i)=Js^T \times Fc_{q,p}(v,\mu) \times Js;$$

and unoverlapping each said overlapped filtered image-data matrix to form an N'×N'−1 filtered image-data matrix comprising said filtered image data terms, denoted by $sf(z,y)$ for $0 \leq y,z \leq N'$, said unoverlapping step accomplished by means of mapping $(N')^2$ said unoverlapped image data terms from each said unoverlapped filtered image-data matrix into a corresponding said filtered image-data matrix in accordance with the relationship, $$sf_{q,p}(z,y)=sv_{q,p}(j+\delta,i+\delta)$$

where $$\delta = \left( \frac{N-N'}{2} \right).$$

4. The method of claim 1 wherein said step of transforming said image-data matrix into an N×N scaled frequency-coefficient matrix comprises the steps of:

applying said scaled orthogonal transform Gs to one of the rows or the columns of said image-data matrix to produce an N×N intermediate matrix;

storing at least one of a row of terms or a column of terms of said intermediate matrix; and applying a transpose of said scaled orthogonal transform to said intermediate matrix to produce said N×N scaled frequency-coefficient matrix.

5. The method of claim 4 wherein said step of applying said scaled orthogonal transform comprises the step of retrieving intermediate matrix terms from memory.

6. The method of claim 1 wherein said scaled orthogonal transform Gs is a scaled forward discrete cosine transform and said scaled inverse orthogonal transform Js is a scaled inverse discrete cosine transform.

7. The method of claim 1 wherein said descaled orthogonal transform Hs is a descaled discrete odd-cosine transform given by the expression $$F(j,i) = 4 \sum_{m=0}^{7} \sum_{n=0}^{7} d_{ij} f(m,n) \cos\left[\frac{ni\pi}{8}\right] \cos\left[\frac{mj\pi}{8}\right].$$

8. The method of claim 1 wherein said N×N overlapped image data matrices are 8×8 matrices.

9. The method of claim 1 wherein said N×N overlapped image data matrices are 16×16 matrices.

10. The method of claim 1 wherein said integer constant ω is equal to k−1.

11. The method of claim 1 wherein said step of inverse transforming each said filtered coefficient matrix comprises the steps of:

applying said pruned scaled inverse orthogonal transform to said filtered coefficient matrix to form an N×N' intermediate filtered image-data matrix; and applying a transpose of said pruned transform to said intermediate filtered image-data matrix to form said N'×N' filtered image-data matrix.

12. The method of claim 1 wherein said step of inverse transforming each said filtered coefficient matrix comprises the steps of:

applying said pruned scaled inverse orthogonal transform to said filtered coefficient matrix to form an N'×N intermediate filtered image-data matrix; and applying a transpose of said pruned transform to said intermediate filtered image-data matrix to form said N'×N' filtered image-data matrix.

13. An image processing method for filtering an electrical image signal by means of an image filter configured as a matrix, the image signal provided as a series of electrical signals where each electrical signal corresponds to a characteristic of an element of a two-dimensional image, said method comprising the steps of:

converting the series of electrical signals into a set of numerical values, each said numerical value quantitatively describing a feature characteristic of a corresponding image element;

formatting said set of numerical values into a plurality of overlapped image-data matrices, such that each said overlapped image-data matrix comprises at least one image-data term found within another overlapped image-data matrix;

applying a scaled discrete cosine transform to each said image-data matrix so as to form a frequency-coefficient matrix;

transforming said image filter matrix into a descaled frequency filter matrix;

mask multiplying said descaled frequency filter matrix with at least one said frequency-coefficient matrix to produce at least one filtered coefficient matrix;

applying a pruned scaled inverse discrete cosine transform to said at least one filtered coefficient matrix to form at least one filtered image-data matrix, said filtered image-data matrix comprising fewer terms than said filtered coefficient matrix; and converting said at least one filtered image-data matrix into a series of filtered electrical signals such that said filtered electrical signals can be configured into a two-dimensional array of filtered image elements, each said filtered electrical signal corresponding to a characteristic of one said filtered image element.

14. The image processing method of claim 13 wherein each said overlapped image-data matrix further comprises at least one column of image-data terms found within said another overlapped image-data matrix.

15. The image processing method of claim 13 wherein each said overlapped image-data matrix further comprises at least one row of image-data terms found within said another overlapped image-data matrix.

16. The image processing method of claim 13 wherein said step of applying a scaled discrete cosine transform to said image-data matrix comprises the steps of:

applying said scaled discrete cosine transform to said image-data matrix to produce an intermediate matrix;

storing at least one term of said intermediate matrix; and applying a transpose of said scaled discrete cosine transform to said intermediate matrix to produce said frequency-coefficient matrix.

17. The image processing method of claim 16 further comprising the step of retrieving matrix terms from memory.

18. The method of claim 13 wherein said step of applying a scaled discrete cosine transform to said image-data matrix comprises the steps of:

applying said scaled discrete cosine transform to at least one row of said image-data matrix to produce a first set of intermediate matrix terms;

retrieving from memory a second set of intermediate matrix terms;

forming an intermediate matrix from said first set of intermediate matrix terms and said second set of intermediate matrix terms;

applying a transpose of said scaled discrete cosine transform to the columns of said intermediate matrix to produce said frequency-coefficient matrix; and storing in memory said first set of intermediate matrix terms.

19. The method of claim 13 wherein said step of transforming said image-data matrix comprises the steps of:

applying said scaled discrete cosine transform to at least one column of said image-data matrix to produce a first set of intermediate matrix terms;

retrieving from memory a second set of intermediate matrix terms;

forming an intermediate matrix from said first set of intermediate matrix terms and said second set of intermediate matrix terms;

applying a transpose of said scaled discrete cosine transform to the rows of said intermediate matrix to produce said frequency-coefficient matrix; and storing in memory said first set of intermediate matrix terms.

20. The image processing method of claim 13 wherein said step of transforming said image filter matrix comprises the steps of forming an interim matrix from a portion of said image filter matrix and applying a discrete odd-cosine transform to said interim matrix.

21. The image processing method of claim 20 wherein said interim matrix comprises a lower right-hand quadrant of said image filter matrix.

22. The image processing method of claim 13 wherein said overlapped image data matrices comprise 8×8 matrices.

23. The image processing method of claim 13 wherein said overlapped image data matrices comprise 16×16 matrices.

24. An apparatus for filtering an electrical image signal by means of an image filter configured as a matrix, the image signal provided as a series of electrical signals where each electrical signal corresponds to a characteristic of an element of a two-dimensional image, said apparatus comprising:

means for converting the series of electrical signals into a set of numerical values, each said numerical value quantitatively describing a feature characteristic of a corresponding image element;

means for formatting said set of numerical values into a plurality of overlapped image-data matrices, such that each said overlapped image-data matrix comprises at least one image-data term found within another overlapped image-data matrix;

means for applying a scaled discrete cosine transform to said image-data matrices so as to form frequency-coefficient matrices;

means for transforming said image filter matrix into a descaled frequency filter matrix;

means for mask multiplying said descaled frequency filter matrix with said frequency-coefficient matrices to produce filtered coefficient matrices;

means for applying a pruned scaled inverse discrete cosine transform to said filtered coefficient matrices so as to form filtered image-data matrices such that said filtered image-data matrices comprise fewer terms than said filtered coefficient matrices; and means for converting said filtered image-data matrices into a series of filtered electrical signals such that said filtered electrical signals can be configured into a two-dimensional array of filtered image elements, each said filtered electrical signal corresponding to a characteristic of one said filtered image element.

25. The apparatus of claim 24 wherein said means for applying a scaled discrete cosine transform to said image-data matrices comprises:

means for applying said scaled discrete cosine transform to said image-data matrices to produce intermediate matrices;

memory means for storing portions of said intermediate matrices; and means for applying a transpose of said scaled discrete cosine transform to said intermediate matrices to produce said frequency-coefficient matrices.

26. The apparatus of claim 25 further comprising means for retrieving said portions of said intermediate matrices from said memory means and means for combining said portions of said intermediate matrices so as to form said intermediate matrices.

* * * * *